US007827309B2

(12) United States Patent
Ito

(10) Patent No.: US 7,827,309 B2
(45) Date of Patent: Nov. 2, 2010

(54) INFORMATION PROCESSING APPARATUS FOR CONCEALING THE IDENTITY OF INTERNET PROTOCOL ADDRESSES

(75) Inventor: Hiromichi Ito, Yokohama (JP)

(73) Assignee: Hitachi, Ltd., Tokyo (JP)

(*) Notice: Subject to any disclaimer, the term of this patent is extended or adjusted under 35 U.S.C. 154(b) by 1161 days.

(21) Appl. No.: 10/617,689

(22) Filed: Jul. 14, 2003

(65) Prior Publication Data
US 2004/0117506 A1   Jun. 17, 2004

(30) Foreign Application Priority Data
Dec. 17, 2002   (JP) .............................. 2002-364551

(51) Int. Cl.
*G06F 15/16* (2006.01)
(52) U.S. Cl. ...................... 709/245; 709/223; 709/224; 709/225
(58) Field of Classification Search ......... 709/202–203, 709/225, 228, 245–246; 379/142.01
See application file for complete search history.

(56) References Cited

U.S. PATENT DOCUMENTS

| 6,052,725 | A  | * | 4/2000  | McCann et al. ............. 709/223 |
| 6,157,829 | A  | * | 12/2000 | Grube et al. ............. 455/414.1 |
| 6,324,178 | B1 | * | 11/2001 | Lo et al. .................. 370/392 |
| 6,463,154 | B1 | * | 10/2002 | Patel ...................... 380/270 |
| 6,502,135 | B1 | * | 12/2002 | Munger et al. ............. 709/225 |
| 6,567,405 | B1 | * | 5/2003  | Borella et al. ............. 370/389 |
| 6,584,098 | B1 | * | 6/2003  | Dutnall .................... 370/354 |
| 6,591,291 | B1 | * | 7/2003  | Gabber et al. ............. 709/206 |
| 6,886,027 | B2 | * | 4/2005  | Tajiri et al. ............... 709/202 |
| 7,054,906 | B2 | * | 5/2006  | Levosky ................... 709/206 |
| 7,120,131 | B2 | * | 10/2006 | Seppala et al. ............. 370/310 |
| 7,120,701 | B2 | * | 10/2006 | Warrier et al. ............. 709/245 |
| 7,317,798 | B2 | * | 1/2008  | Saito ...................... 380/277 |
| 7,423,998 | B2 | * | 9/2008  | Kim ....................... 370/338 |
| 7,436,804 | B2 | * | 10/2008 | O'Neill ................... 370/331 |
| 2003/0097473 | A1 | * | 5/2003  | Saitoh ..................... 709/245 |
| 2003/0193921 | A1 | * | 10/2003 | Kim ....................... 370/338 |
| 2003/0211842 | A1 | * | 11/2003 | Kempf et al. .............. 455/411 |
| 2004/0252683 | A1 | * | 12/2004 | Kennedy et al. ............ 370/389 |

FOREIGN PATENT DOCUMENTS

JP   11224239       8/1999
JP   2001 211180    8/2001

OTHER PUBLICATIONS

R. Droms, et al Dynamic Host Configuration Protocol for IPv6 (DHCPPv6), Internet Draft, Nov. 2, 2002, draft-ietf-dhc-dhcopv6-28.txt., 7 pages.
Hinden, R. and Deering, S., "IP Version 6 Addressing Architecture", RFC2373, Jul. 1998, pp. 1-26.
Narten, et al., "Extensions to IPv6 Address Autoconfiguration", RFC3041, Jan. 2001.

* cited by examiner

*Primary Examiner*—Shawki S Ismail
(74) *Attorney, Agent, or Firm*—Brundidge & Stanger, P.C.

(57) ABSTRACT

Even if a third party intercepts a packet flowing on the Internet, it is made difficult to identify which information processing apparatuses are performing communication with each other. In a communication system, there is provided a virtual address server for pooling a plurality of for-rent-out virtual global addresses to be temporarily used by a communication apparatus. When a first information processing apparatus performs communication with a second information processing apparatus, the first information processing apparatus requests the virtual address server to rent out a virtual global address. Next, based on this request, the virtual address server rents out this virtual global address. Moreover, the first information processing apparatus sends out a communication packet whose transmission-source address is set up by this virtual global address and whose transmission-destination address is set up by the global address of the second information processing apparatus.

1 Claim, 7 Drawing Sheets

| RENT-OUT VIRTUAL ADDRESS | RENT-OUT TIME-LIMIT | RENT-OUT DESTINATION REAL ADDRESS | COMMUNICATION DESTINATION ADDRESS | |
|---|---|---|---|---|
| 5-5FFFF0-0001 | 0209011233 | 2-7FFFF0-6E9A | 2-7FFFF0-6F10 | ~210a |
| 5-5FFFF0-0002 | 0209011334 | 4-8FFFF9-DC25 | 4-8FFFF9-DD30 | ~210b |
| 5-5FFFF0-0003 | | | | |
| 5-5FFFF0-0004 | | | | |
| 5-5FFFF0-0005 | | | | |
| 5-5FFFF0-0006 | | | | |
| 5-5FFFF0-0007 | | | | |
| 5-5FFFF0-FFFF | | | | ~210n |

201, 202, 203, 204, 200

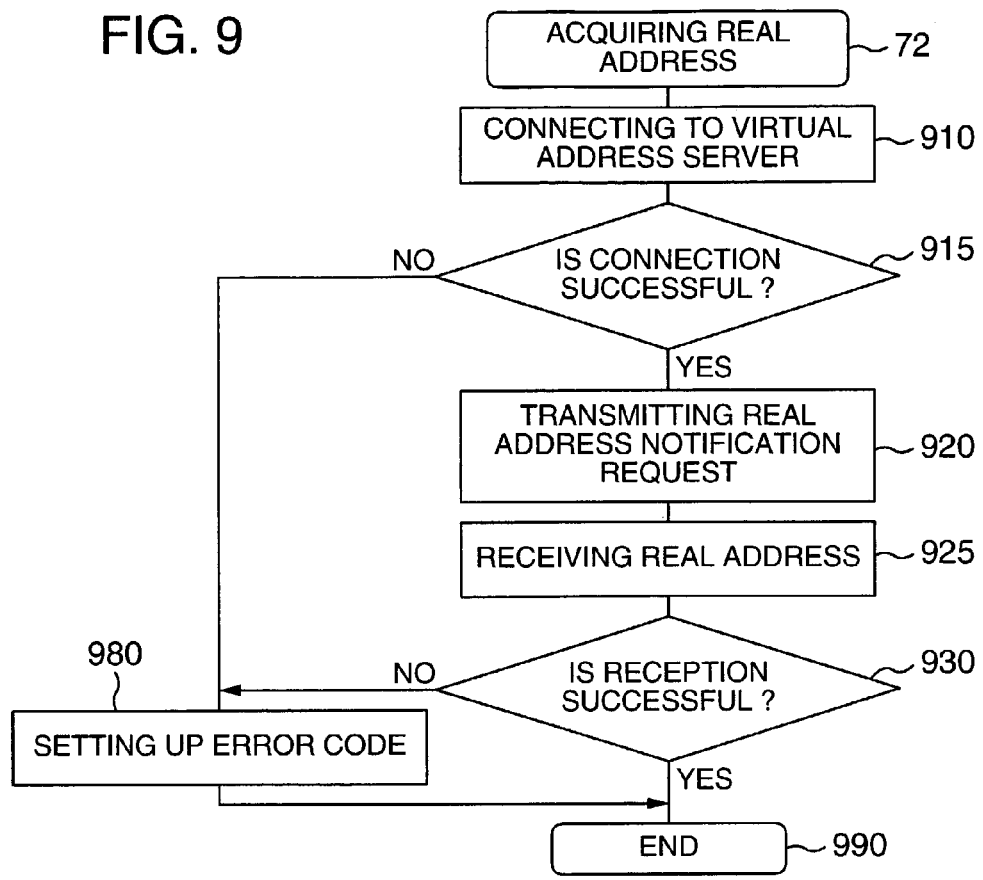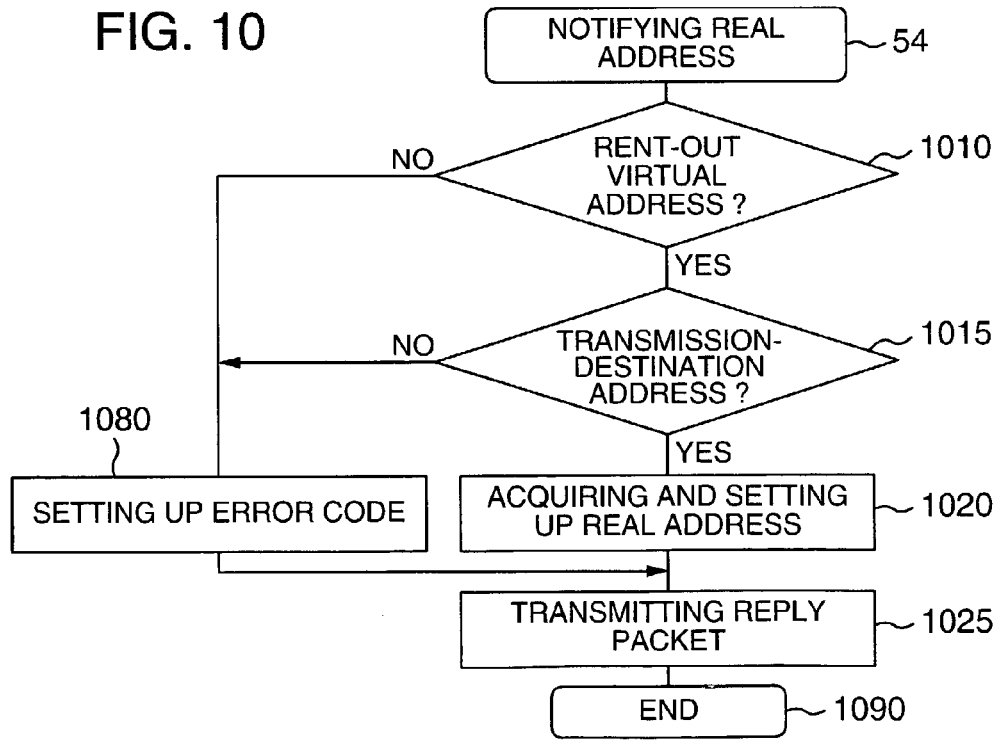

INFORMATION PROCESSING APPARATUS FOR CONCEALING THE IDENTITY OF INTERNET PROTOCOL ADDRESSES

BACKGROUND OF THE INVENTION

The present invention relates to a communication apparatus, a communication method, and a communication system for performing a communication over a network.

In recent years, the IP protocol, i.e., the standard protocol in the Internet, has substantially become the standard protocol in the field of communications. Accordingly, the IP protocol is now in wide use such as mails and Web accesses. The IP protocol that is in the mainstream at present is a one according to the specification referred to as "IPv4". In contrast to this, a specification referred to as "IPv6" whose address space is largely extended has been defined. The IP addresses defined by the IPv6, which have a 128-bit address space, make it possible even to assign global IP addresses fixedly to all the appliances and sensors existing all over the world. Refer to, e.g., Literature 1: RFC2373, R. Hinden and S. Deering, "IP Version 6 Addressing Architecture", July 1998, pp. 1-26.

Meanwhile, T. Narten et al. of IBM have proposed the following privacy-protecting method: A transmission-source appliance itself generates, at random, an interface ID that occupies the lower 64 bits of an IPv6 address, thus generating a temporary IPv6 address which is effective only in a connection unit or in a time-period such as 1 day or 1 week. Next, the transmission-source appliance uses either the temporary IPv6 address or the permanent IPv6 address depending on the case, thereby protecting privacy. Refer to, e.g., Literature 2: T. Narten et al., "Extensions to IPv6 Address Autoconfiguration", RFC 3041, January 2001.

SUMMARY OF THE INVENTION

The IP protocol that is in the mainstream at present is the one according to the specification referred to as the IPv4, which has a 32-bit address space. Its upper bits, however, are used as subnet addresses for identifying areas or organizations in order to facilitate a routing on the network. Consequently, the number of the addresses that can actually be assigned to the appliances is not large enough. This situation have resulted in the employment of a scheme that a service provider or the like, with which an end-user has made the contract, rents out an IP address dynamically. Also, in addition to the above-described scheme, a communication is performed employing the following method so as to deal with the shortage of the global address number available: Within a home or an enterprise, the IP address allocation that is local therein (i.e., so-called private addresses or local addresses) is used. Moreover, when accessing the Internet outside the home or the enterprise, the addresses are converted into the IP addresses (i.e., so-called global addresses) which are unique and do not overlap with addresses of other appliances on the Internet.

However, appliances which are connected to the network and populations who take advantage of the network are rapidly increasing in number. As a result, it is becoming more and more difficult to resolve the shortage of the global address number by utilizing only the above-described dynamical address rent-out and local addresses. Also, in usage such as IP telephones, which are expected to be widely prevalent in the near future, or an application that allows direct individual-to-individual basis communication, a partner to be accessed is specified using his or her IP address. This gives rise to a problem that utilization of a dynamical address or private addresses is unsuitable therefor. In order to solve these problems, the specification referred to as the IPv6 whose address space is largely extended has been defined. For example, as indicated in the above-described Literature 1, the IP addresses defined by the IPv6 have a 128-bit address space, and accordingly make it possible even to assign the global IP addresses fixedly to all the appliances and sensors existing all over the world.

If, however, the IPv6 global addresses are fixedly used for the IP telephones, or for the application that allows direct individual-to-individual basis communication (i.e., so-called Peer to Peer communication application), there is a possibility that there occurs a privacy invasion by a third party with malice. Namely, the third party intercepts a communication packet flowing on the Internet, thereby seeing and finding the transmission-source IP address and the transmission-destination IP address stored in the header portion of the communication packet. This finding permits the third party to easily know information about, e.g., who and who are performing the communication with each other by using the IP telephone or the application that allows direct individual-to-individual basis communication. This is a novel problem that has not existed in the case of using the dynamical IP address or the conversion from the local addresses into the global addresses. Also, the following problem is expected to become a serious one in the near future: Individuals and the IP addresses are eventually brought into unique correspondence with each other. This situation enhances a possibility that a nuisance IP telephone call will be given, or that harassment-intended communication connection, an attack for unauthorized access, or the like will be performed.

In order to deal with these problems, there exist a representative access using a proxy server, and a data encryption technique based on the IP sec. The method using the proxy server is effective in a case where the transmission-source exists on a closed network and a desired access-destination exists on a different (open) network beyond the proxy server. In the other cases, however, monitoring the packets that enter/ leave the proxy server makes it possible to easily identify or estimate who and who are performing communication with each other. In the method based on the IP sec, there has also existed the following problem: Even if the contents themselves of communication data can be encrypted, the address of the transmission-source and that of the transmission-destination described in the header of the communication data have been not encrypted. Accordingly, it is impossible to conceal the respective addresses.

Meanwhile, as indicated in the above-described Literature 2, T. Narten et al. of IBM have proposed the following privacy-protecting method: The transmission-source appliance itself generates, at random, the interface ID that occupies the lower 64 bits of the IPv6 address, thus generating the temporary IPv6 address which is effective only in a connection unit or in a time-period such as 1 day or 1 week. Next, the transmission-source appliance uses either the temporary IPv6 address or the permanent IPv6 address depending on the case, thereby protecting privacy.

In the above-described technique by T. Narten et al., however, it is difficult to protect privacy in a subnet unit, i.e., privacy about, e.g., where the access has been made in a company unit or in a family unit. Also, in the case of simply using a random address, there has existed the following problem: Even the receiving party finds it difficult to know who the transmitting party truly is. This, eventually, leads to approvals to an unauthorized action or a nuisance behavior.

Accordingly, it is an object of the present invention to provide a communication apparatus, a communication method, and a communication system that use the global and fixedly-allocated IP addresses for identifying communication-performing concerned parties and the appliances corresponding thereto. Simultaneously, even if a third party intercepts a packet on the network, the apparatus, the method, and the system make it impossible for the third party to judge which concerned party or which corresponding appliance and which concerned party or which corresponding appliance are performing the communication with each other.

Also, it is another object of the present invention to provide a method for allowing a concerned party or the corresponding appliance to know the IP address of a transmission-source of a communication packet, when the concerned party or the corresponding appliance has received the communication packet which has been addressed thereto and whose transmission-source IP address has been concealed.

In order to accomplish the above-described object, in the communication system of the present invention, there is provided a virtual address server for pooling a plurality of for-rent-out virtual global addresses to be temporarily used by a communication apparatus. Here, when a first information processing apparatus performs communication with a second information processing apparatus, the first information processing apparatus requests the virtual address server to rent out a virtual global address. Next, based on this request, the virtual address server rents out the virtual global address. Moreover, the first information processing apparatus sends out a communication packet whose transmission-source address is set up as the virtual global address and whose transmission-destination address is set up as the global address of the second information processing apparatus. This configuration makes it possible to conceal, from a third party, the addresses of the transmitting party and the receiving party who are performing the communication with each other.

Also, in order to accomplish another object described above, the virtual address server in the communication system of the present invention holds a correspondence table having a correspondence relationship among the original global address (hereinafter, referred to as "real address") allocated to the first information processing apparatus, the global address of the second information processing apparatus, and the rented-out virtual global address. Furthermore, in response to an inquiry made from the second information processing apparatus about the address of the transmitting party, the virtual address server, using the rented-out virtual global address, retrieves the real address allocated to the first information processing apparatus that has sent out the communication packet. Next, the virtual address server permits only the second information processing apparatus to be informed of this real address.

Other objects, features and advantages of the invention will become apparent from the following description of the embodiments of the invention taken in conjunction with the accompanying drawings.

BRIEF DESCRIPTION OF THE DRAWINGS

FIG. 9 is a diagram for illustrating one example of the flow of a real address acquiring program 72 in the embodiment of the present invention; and FIG. 10 is a flowchart for illustrating one example of the operation of a real address notifying program 54 in the embodiment of the present invention.

DESCRIPTION OF THE EMBODIMENTS

Figure 1:
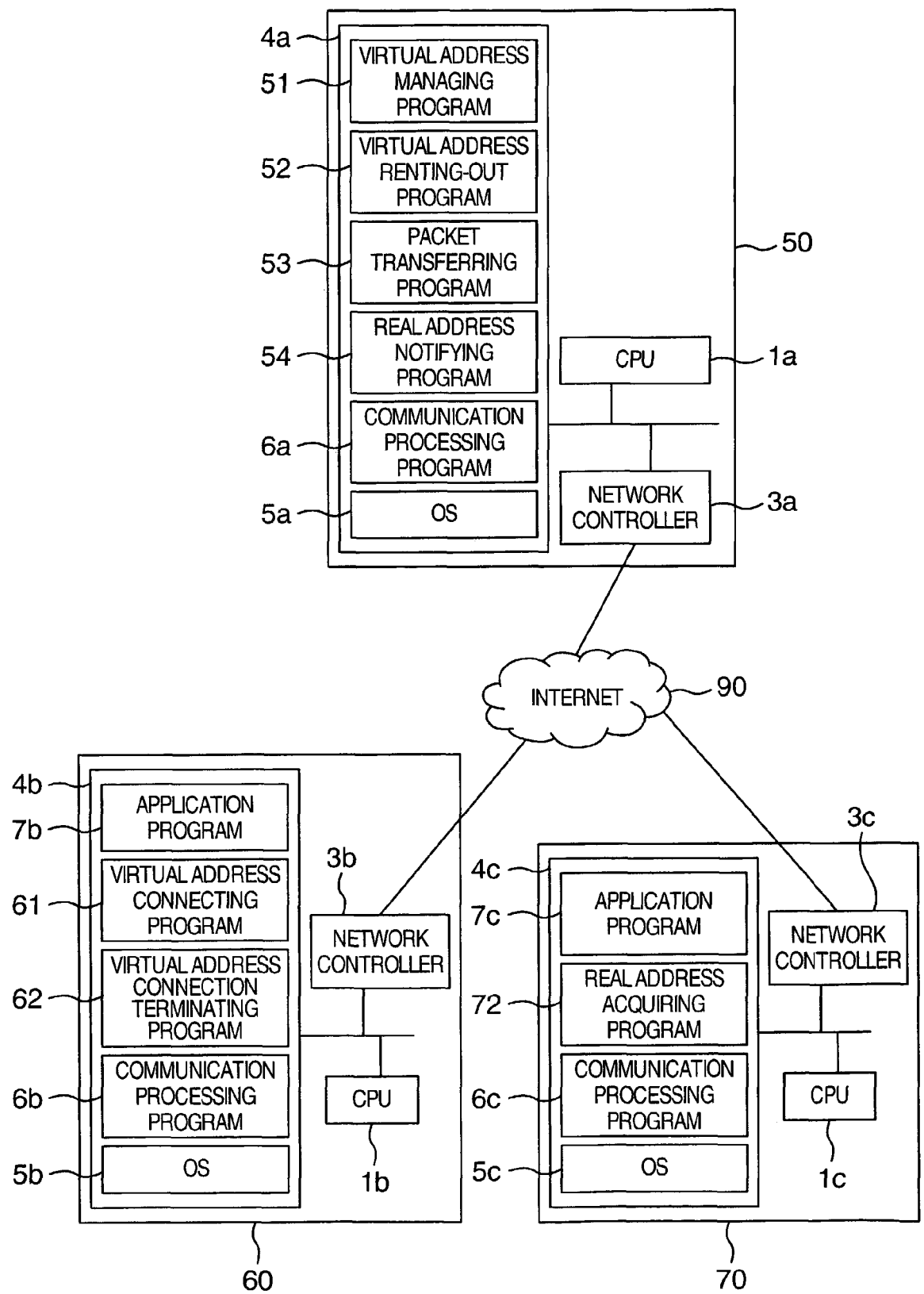
FIG. 1 illustrates one configuration example of the communication system in an embodiment of the present invention.

Hereinafter, referring to the drawings, explanation will be given below concerning one embodiment of the present invention.

At first, the entire system configuration will be explained below. FIG. 1 illustrates one configuration example of the communication system of the present invention. Reference numerals 50, 60, and 70 denote a virtual-address-server information processing apparatus, a transmission-side information processing apparatus, and a reception-side information processing apparatus, respectively. The respective apparatuses 50, 60, and 70 include at least central processing units (:CPUs) 1a, 1b, and 1c, memories 4a, 4b, and 4c, and network controllers 3a, 3b, and 3c, respectively. In the virtual-address-server apparatus 50, an operating system (:OS) 5a, a communication processing program 6a, a virtual address managing program 51, a virtual address renting-out program 52, a packet transferring program 53, and a real address notifying program 54 are loaded onto the memory 4a, then being executed by the CPU 1a. In the transmission-side apparatus 60, an operating system (:OS) 5b, a communication processing program 6b, a virtual address connecting program 61, a virtual address connection terminating program 62, and an application program 7b are loaded onto the memory 4b, then being executed by the CPU 1b. Also, in the reception-side apparatus 70, an operating system (:OS) 5c, a communication processing program 6c, a real address acquiring program 72, and an application program 7c are loaded onto the memory 4c, then being executed by the CPU 1c.

The virtual-address-server information processing apparatus 50, the transmission-side information processing apparatus 60, and the reception-side information processing apparatus 70, which are connected to each other over a network 90, perform communications via the respective network controllers 3a, 3b, and 3c. Although, in FIG. 1, the embodiment has been illustrated where the network controllers 3a, 3b, and 3c and the network 90 are directly connected, relay appliances, such as hubs and routers, are generally inserted onto connection points to the network 90 and onto communication paths within the network 90. In carrying out the present invention, however, these appliances can be regarded as being "transparent", and thus will be omitted.

Figures 2, 3:
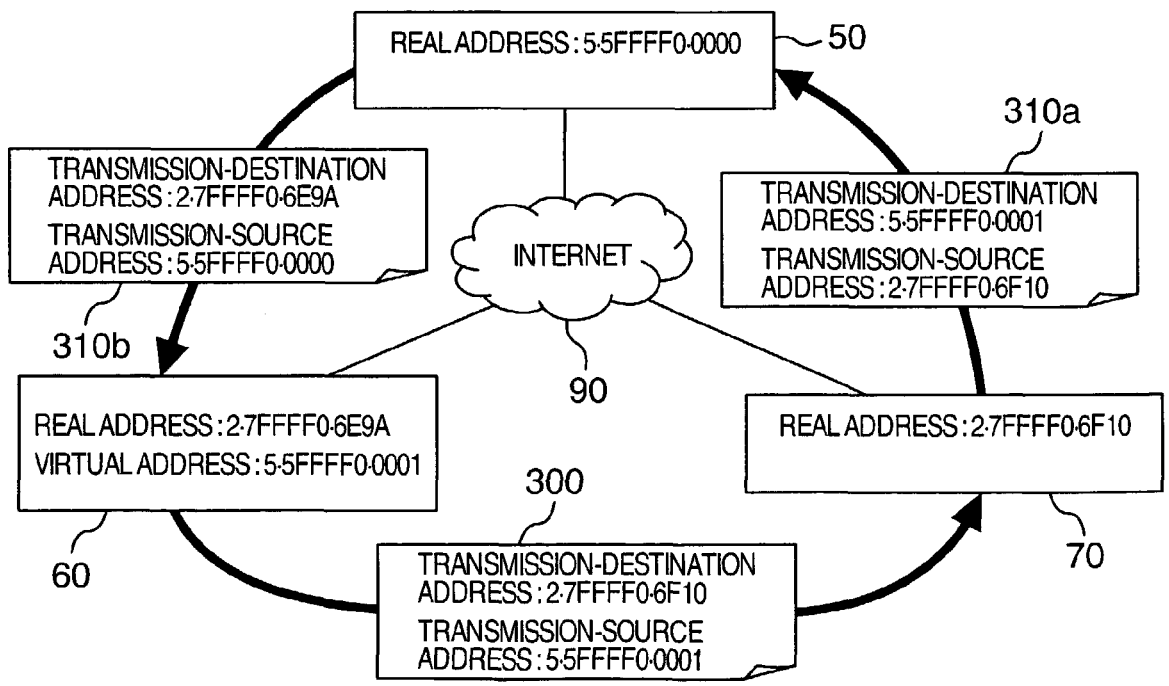
FIG. 2 illustrates one configuration example of a virtual address table 200 in the embodiment of the present invention.
FIG. 3 is a diagram for illustrating the operation outline of communications in the embodiment of the present invention.

The virtual-address-server apparatus 50 holds, on the memory 4a or the like, a virtual address table 200 whose one example is illustrated in FIG. 2. The virtual address table 200 has recorded a plurality of records 210a, 210b, . . . , 210n each of which includes the following fields: A rent-out virtual address 201, a rent-out time-limit 202, a rent-out destination real address 203, and a communication destination address 204. Here, the respective rent-out virtual addresses 201 are virtual global addresses pooled for being rented out. In the present embodiment, 128-bit IPv6 addresses are used as the rent-out virtual addresses 201. Although, in FIG. 2, hexadecimal notation is employed for representing the addresses, the number of the digits is large, and thus the digits halfway are represented by being abbreviated using "•". Hereinafter, basically the same notation will be employed for the other addresses. Here, information recorded in the respective fields of the rent-out time-limit 202, the rent-out destination real address 203, and the communication destination address 204 of the record 210 corresponding to a rent-out virtual address 201 are as follows, respectively: time and date of the valid rent-out time-limit, a real address assigned to the transmission-side apparatus 60, i.e., the rent-out destination, and the real address of the reception-side apparatus 70, i.e., the target apparatus with which the transmission-side apparatus 60 performs communication using the virtual address 201 indicated from the virtual-address-server apparatus 50 when the rent-out has been performed.

Figure 4:
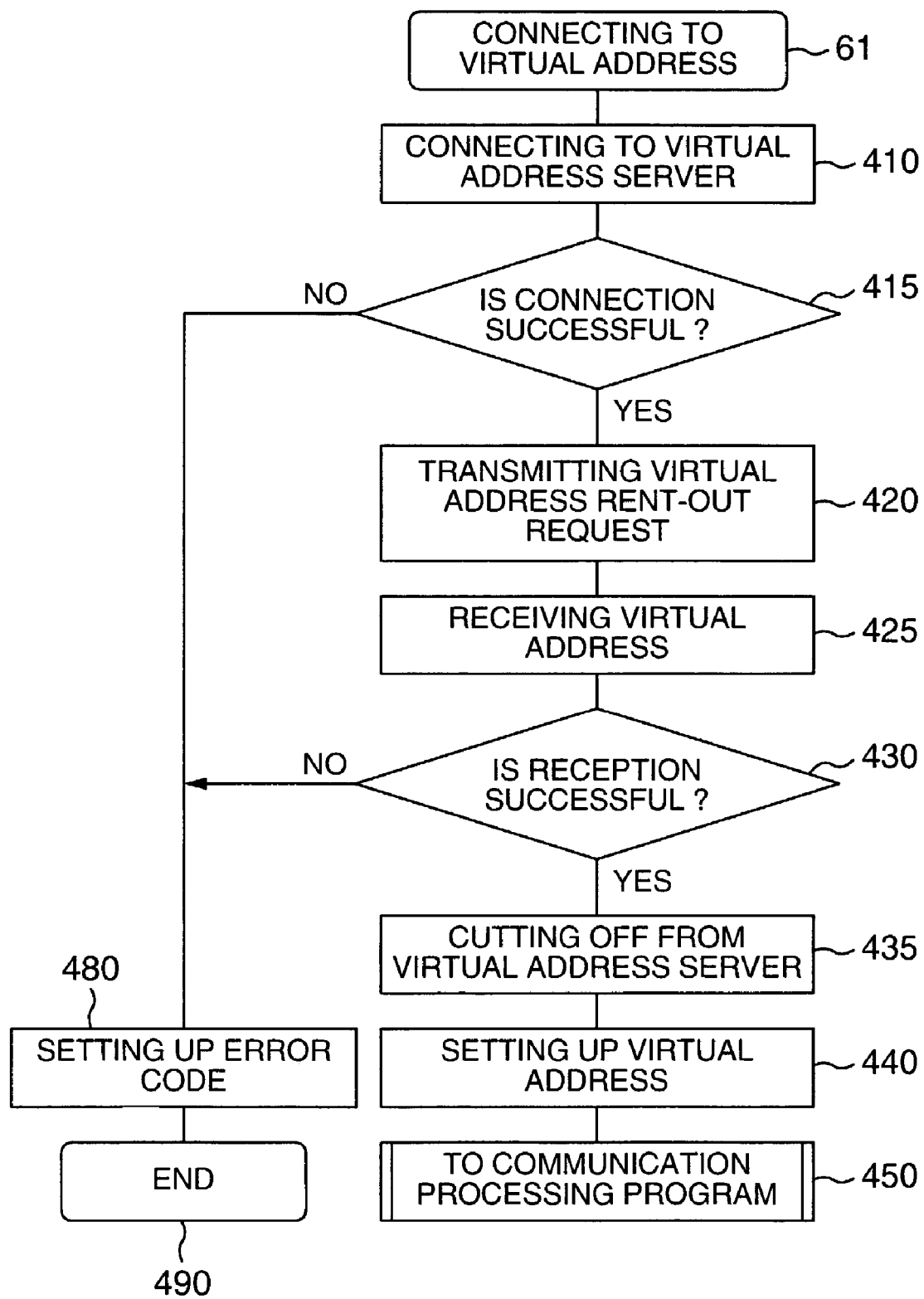
FIG. 4 is a flowchart for illustrating one example of the operation of a virtual address connecting program 61 in the embodiment of the present invention.

Next, referring to drawings, explanation will be given below concerning the operations of the virtual address connecting program 61 and the virtual address connection terminating program 62 which the transmission-side apparatus 60 executes when performing communication. FIG. 4 is a flowchart for illustrating one example of the operation of the virtual address connecting program 61. At first, at Step 410, connection to the virtual address server 50 is performed. In this connection, encrypted communication is performed between the transmission-side apparatus 60 and the virtual address server 50. Accordingly, exchange of necessary session keys is performed, thereby establishing a secure connection relationship. Next, at Step 415, it is judged whether or not the connection has been successful. If the connection has failed, an error code is set up at Step 480, and the virtual address connecting program is terminated at Step 490. Meanwhile, if the connection has been successful, at Step 420, the apparatus 60 transmits a virtual address rent-out request, employing, as parameters, the real address of its own and the real address of the communication destination party. At Step 425, the apparatus 60 receives a response (virtual address) to the request. Moreover, at Step 430, it is checked whether or not an error code has been set up onto the response. If there exists an error, the error code is set up at Step 480, and the virtual address connecting program is terminated at Step 490. Meanwhile, if there exists no error, the connection with the virtual address server 50 is cut off at Step 435 and, at Step 440, the received virtual address is set up in substitution for the real address so that the virtual address is usable in communications thereinafter. Furthermore, at Step 450, the apparatus 60 transfers the control to the communication processing program 6b, thereby performing communication connection processing with the reception-side apparatus 70 with the virtual address set up as the real address of its own.

Figure 5:
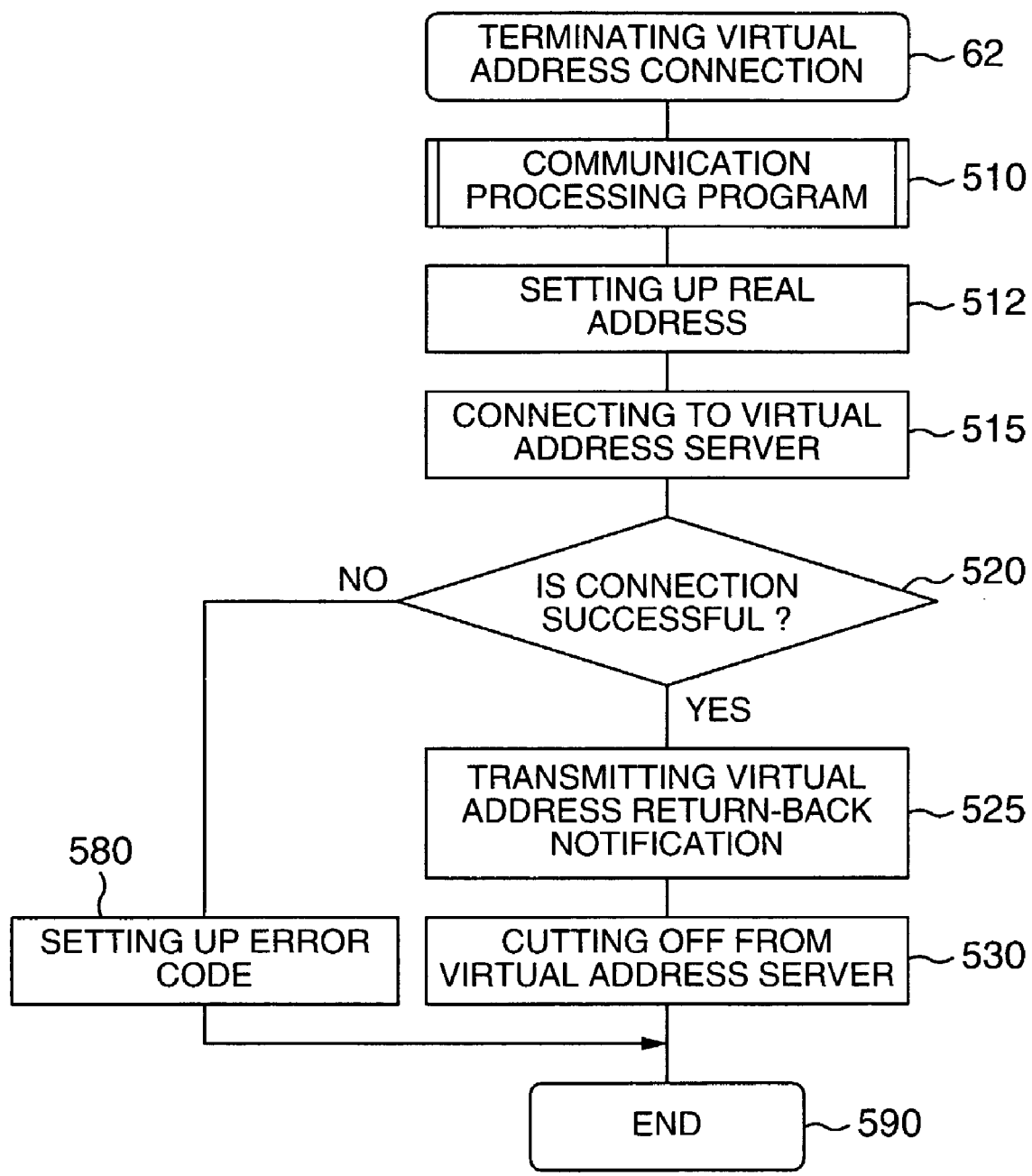
FIG. 5 is a flowchart for illustrating one example of the operation of a virtual address connection terminating program 62 in the embodiment of the present invention.

FIG. 5 is a flowchart for illustrating the operation of the virtual address connection terminating program 62 for performing connection termination at the time of terminating the above-described communication. At first, at Step 510, the connection with the reception-side apparatus 70 is cut off by using the communication processing program 6b. Next, at Step 512, operation is performed which restores, back to the real address, the virtual address set up by the virtual address connecting program 61 in substitution for the real address. At subsequent Step 515, an attempt is made to establish connection to the virtual address server 50. Moreover, at Step 520, it is judged whether or not the connection has been successful. If the connection has failed, an error code is set up at Step 580, and the virtual address connection terminating program 62 is terminated at Step 590. If the connection has been successful, at Step 525, a virtual address return-back notification is transmitted to the virtual address server 50. Furthermore, the connection with the virtual address server 50 is cut off at Step 530, and the virtual address connection terminating program 62 is terminated at Step 590.

Figure 7:
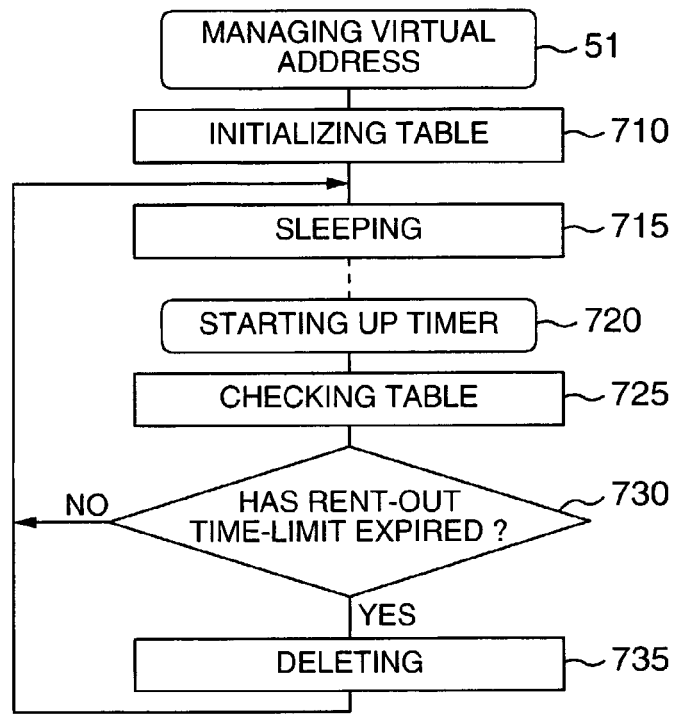
FIG. 7 is a flowchart for illustrating one example of the operation of a virtual address managing program 51 in the embodiment of the present invention.

Next, referring to the drawings, explanation will be given below concerning one example of the operation of the virtual address managing program 51, the virtual address renting-out program 52, and the packet transferring program 53, i.e., the programs on the virtual address server 50. FIG. 7 is a flowchart for illustrating the operation of the virtual address managing program 51. At Step 710, the virtual address table 200 illustrated in FIG. 2 is created and initialized. At subsequent Step 715, set-up is performed which is intended to keep the program at rest (i.e., sleeping) for a constant time-interval and then to re-operate the program. This keeps the program sleeping at first. At Step 720, re-operation is started by a timer start-up that the OS 5a executes after the constant time-interval in accordance with the above-described set-up. At Step 725, the virtual address table 200 is checked, thereby inspecting whether or not there exits a record 210 that has exceeded the rent-out time-limit 202. At Step 730, if, as a result of the checking, there exists none of the record 210 whose time-limit has expired, operation goes back to Step 715. Meanwhile, if there exists the record 210 whose time-limit has expired, at Step 735, the respective fields of the rent-out time-limit 202, the rent-out destination real address 203, and the communication destination address 204 of the above-described very record 210 are deleted, thereby resolving the rented-out state. After that, operation goes back to Step 715. This makes it possible to prevent the rented-out state from remaining correctly unresolved for some cause or other.

Figure 6:
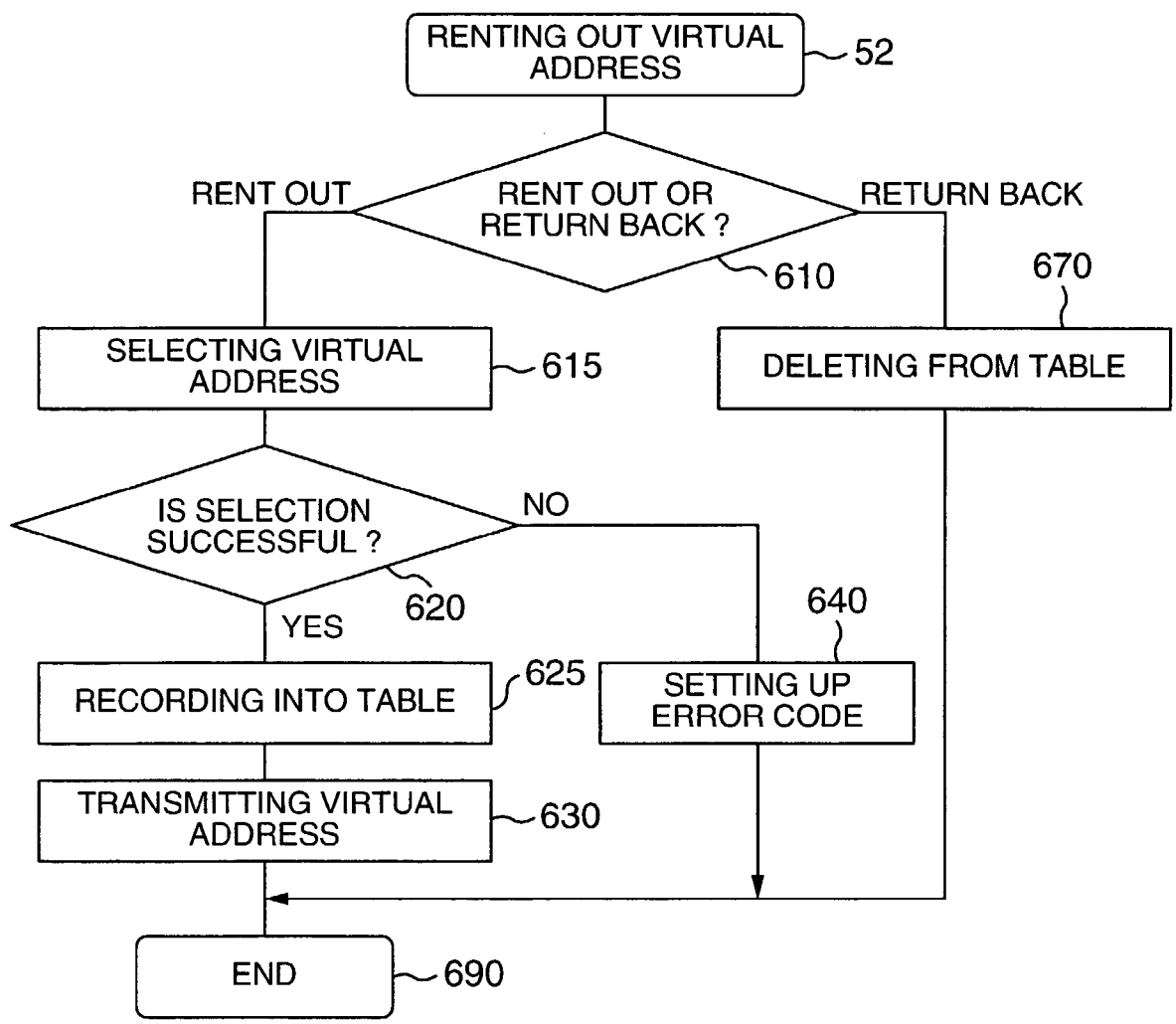
FIG. 6 is a flowchart for illustrating one example of the operation of a virtual address renting-out program 52 in the embodiment of the present invention.

FIG. 6 is a flowchart for illustrating the operation of the virtual address renting-out program 52. At Step 610, it is judged whether a request from the transmission-side apparatus 60 is a virtual address rent-out request or a virtual address return-back request. In the case of the return-back request, the respective fields of the rent-out time-limit 202, the rent-out destination real address 203, and the communication destination address 204 of the record 210 corresponding to a virtual address included in the above-described request are deleted from the virtual address table 200 at Step 670. Meanwhile, if, at Step 610, the above-described request is judged to be the rent-out request, one record 210 including a not-yet rented-out virtual address within the virtual address table 200 is selected at Step 615. Next, at Step 620, it is judged whether or not this selection has failed because of a reason such that all the virtual addresses have been already rented out. In the case of the failure, an error code is set up at Step 640, and the virtual address renting-out program 52 is terminated at Step 690. Meanwhile, if this selection has been found to be successful, at Step 625, the respective fields of the rent-out time-limit 202, the rent-out destination real address 203, and the communication destination address 204 of the above-described one record 210 are recorded and set up. Furthermore, at Step 630, the selected virtual address is transmitted to the transmission-side apparatus 60, i.e., the requesting source, and, at Step 690, the virtual address renting-out program 52 is terminated.

Figure 8:
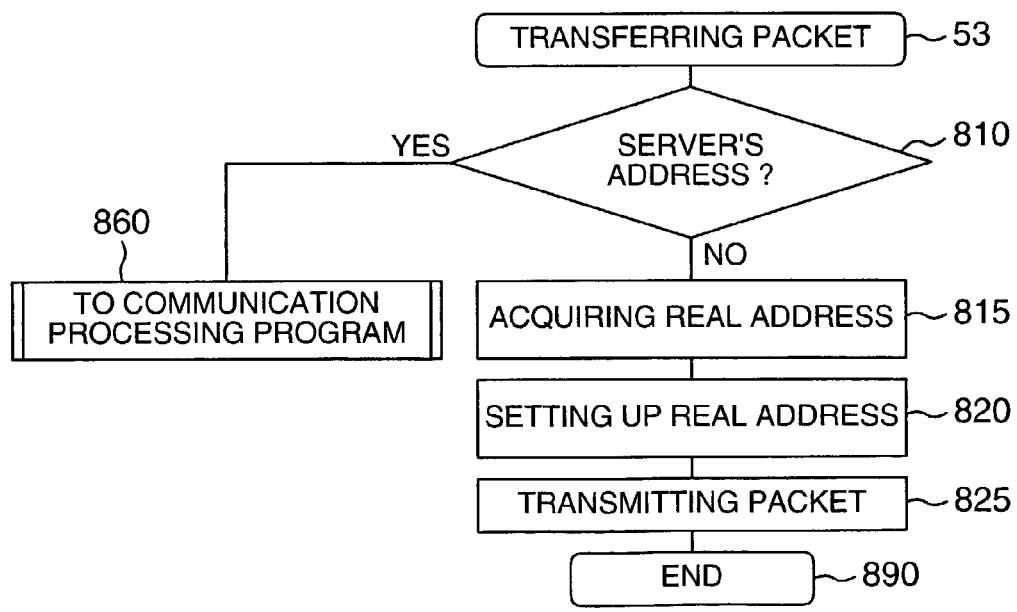
FIG. 8 is a diagram for illustrating one example of the flow of a packet transferring program 53 in the embodiment of the present invention.

FIG. 8 is a diagram for illustrating one example of the flow of the packet transferring program 53 that operates on the virtual address server 50. At Step 810, it is judged whether or not the transmission-destination address of a packet received is the real address of the virtual address server 50 itself. If the transmission-destination address is the real address of the virtual address server 50 itself, at Step 860, the server 50 transfers the processing to the communication processing program 6a, then performing the ordinary processing. Meanwhile, if the transmission-destination address is not the real address of the virtual address server 50 itself, at Step 815, the transmission-destination address is retrieved from the rent-out virtual address field 201 of the virtual address table 200. Subsequently, the real address is acquired from the rent-out destination real address field 203 of a record 210 corresponding to the transmission-destination address. Moreover, at Step 820, this real address is stored into the transmission-destination address of the above-described packet and, at Step 825, the packet is transmitted. On account of this, in response to the packet that the reception-side apparatus 70 had received from the transmission-side apparatus 60, a reply packet, which has been replied using, as its transmission-destination address, the virtual address used as the transmission-source address of the packet, can be delivered to the transmission-side apparatus 60. In this way, the reply packet is brought back thereto via the virtual address server 50. This, even if a third party wiretaps the packet on the network 90, makes it impossible for the third party to judge that the packet is a one that the reception-side apparatus 70 has transmitted to the transmission-side apparatus 60.

FIG. 3 is a diagram for illustrating the operation outline of a communication that, in the above-described system of the present invention, is performed between the transmission-side apparatus 60 and the reception-side apparatus 70 after the above-described communication connection explained using FIG. 4 has been completed. In the present embodiment, the addresses concerned are defined as follows: The real address of the transmission-side apparatus 60: "2•7FFFF0•6E9A", the virtual address of the apparatus 60 acquired from the virtual address server 50: "5•5FFFF0•0001", the real address of the reception-side apparatus 70: "2•7FFFF0•6F10", and the real address of the virtual address server 50: "5•5FFFF0•0000".

The transmission-source address of a packet 300 transmitted from the transmission-side apparatus 60 to the reception-side apparatus 70 is the virtual address of the apparatus 60, i.e., "5•5FFFF0•0001". The transmission-destination address of the packet 300 is the real address of the reception-side apparatus 70, i.e., "2•7FFFF0•6F10". Accordingly, even if a third party intercepts this packet, the third party cannot identify the transmitting party as the transmission-side apparatus 60. Also, the transmission-destination address of a response packet 310a in response to the packet 300 is the virtual address, i.e., "5•5FFFF0•0001", and the transmission-source address thereof is the real address of the reception-side apparatus 70, i.e., "2•7FFFF0•6F10". Accordingly, even if the third party intercepts this response packet, the third party cannot identify the reception-side apparatus 70 as performing the communication with the transmission-side apparatus 60. Also, the transmission-destination address of the reply packet 310a is the virtual address, i.e., "5•5FFFF0•0001", and the routing on the network 90 is performed assuming that the apparatus to which this address has been allocated is the virtual address server 50. Consequently, the reply packet 310a is delivered to the virtual address server 50. Moreover, the above-described packet transferring program 53 replaces the transmission-destination address and the transmission-source address of the response packet 310a by the real address of the transmission-side apparatus 60, i.e., "2•7FFFF0•6E9A", and the real address of the virtual address server 50, i.e., "5•5FFFF0•0000", thereby creating a reply packet 310b. This reply packet 310b is delivered to the transmission-side apparatus 60. Consequently, even if the third party intercepts the reply packets 310a and 310b, the third party cannot identify the reception-side apparatus 70 as performing the communication with the transmission-side apparatus 60.

Next, referring to FIG. 9 and FIG. 10, explanation will be given below concerning processing in a case where the reception-side apparatus 70 confirms the real address of the packet that the apparatus 70 has received.

FIG. 9 is a diagram for illustrating one example of the flow of the real address acquiring program 72 that operates on the reception-side apparatus 70. At Step 910, connection to the virtual address server 50 is performed. In this connection, encrypted communication is performed between the reception-side apparatus 70 and the virtual address server 50. Accordingly, exchange of the necessary session keys is performed, thereby establishing a secure connection relationship. Next, at Step 915, it is judged whether or not the connection has been successful. If the connection has failed, an error code is set up at Step 980, and the real address acquiring program 72 is terminated at Step 990. If the connection has been successful, at Step 920, the apparatus 70 transmits a real address notification request to the virtual address server 50, employing, as parameters, the real address of its own and the transmission-source address described in the received packet. At subsequent Step 925, the apparatus 70 receives a response (real address) to the request. Moreover, at Step 930, it is checked whether or not an error code has been set up onto the response. If there exists an error, the error code is set up at Step 980, and the real address acquiring program 72 is terminated at Step 990. If there exists no error, the real address acquiring program 72 is terminated at Step 990, employing the acquired real address as the termination parameter.

FIG. 10 is a flowchart for illustrating one example of operation of the real address notifying program 54 that operates on the virtual address server 50. The real address notifying program 54 is called up by Step 920 of the real address acquiring program 72 on the reception-side apparatus 70. At Step 1010, it is checked whether or not the virtual address included in the real address acquisition request received from the reception-side apparatus 70 exists within the rent-out virtual address field 201 of the virtual address table 200. If there exists no virtual address, an error code is set up at Step 1080, and a reply packet is transmitted at Step 1025. If there exists the virtual address, in order to check whether or not the address stored in the communication destination address field 204 of a record 210 including the virtual address coincides with the real address of the reception-side apparatus 70, comparison is made therebetween. If both of the addresses differ from each other, the error code is set up at Step 1080, and the reply packet is transmitted at Step 1025. If both of the addresses coincide with each other, at Step 1020, the address stored in the rent-out destination real address field 203 of the above-described record 210 is read out, then being set up as a replay parameter. Furthermore, at Step 1025, the reply packet including the replay parameter is transmitted to the reception-side apparatus 70.

The above-described processing explained referring to FIG. 9 and FIG. 10 allow the reception-side apparatus 70 to know the real address of the transmission-source of a packet that has employed the virtual address. On account of this, in the communication system according to the present invention where anonymity to a third party has been enhanced, the reception-side apparatus 70 is capable of selectively denying a communication packet transmitted from an unintended information processing apparatus. Also, as describe above, the real-address inquiry to the virtual address server 50 has been encrypted, and further no response is made to the real-address inquiry from a party other than the concerned parties of the communication. This maintains the confidentiality of the communication target party to the third party, i.e., the characteristic of the system according to the present invention.

In the embodiment described so far, explanation has been given assuming that the configuration of the transmission-side apparatus 60 and that of the reception-side apparatus 70 differ from each other. However, by implementing the virtual address connecting program 61 and the virtual address connection terminating program 62 on the reception-side apparatus 70 as well, it also becomes possible to perform a communication where the virtual addresses are used with each other.

Also, in the embodiment described so far, the example has been given where the packet transferring program 53 is implemented on the virtual address server 50. The packet transferring program 53, however, does not necessarily exists on the virtual address server 50. Instead, it is preferable enough that the program 53 exists on an information processing apparatus that behaves such that the apparatus has virtual addresses to be rented out.

As having been explained so far, according to the present invention, despite the fact that the global and fixedly-allocated address of each information processing apparatus has been used as the transmission-destination address assigned to a communication packet on the network, even if a third party intercepts the communication packet on the network in order to know which information processing apparatus and which information processing apparatus are performing the communication, the third party finds it impossible to identify or to judge this situation. This condition results in an effect of making it possible to protect privacy in the communication and to enhance reliability in the communication.

Also, the information processing apparatus that has received the communication packet can know the transmission-source address of the communication packet, but the third party can not know this information. This condition results in an effect of making it possible to perform a defense while maintaining privacy, an example of the defense being the denial of a communication packet from an unauthorized transmitting party.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A third information processing apparatus provided on a network and performing rent-out of an address, said third information processing apparatus comprising:

an Internet Protocol (IP) address pool including rent-out virtual IP addresses;

a receiver that receives a virtual IP address rent-out request from a first information processing apparatus, the virtual IP address rent-out request including an original real IP address of a second information processing apparatus;

a storage that stores correspondence information having a correspondence relationship among an original real IP address of said first information processing apparatus, a rent-out virtual IP address, and said original real IP address of said second information processing apparatus included in said virtual IP address rent-out request; and a transmitter that transmits said a rent-out virtual IP address to said first information processing apparatus, wherein said first information processing apparatus sends communication packets to said second information processing apparatus, said communication packets including said rent-out virtual IP address as a source address, and said original real IP address of said second information processing apparatus as a destination address, wherein, in response to an inquiry from said second information processing apparatus, said third information processing apparatus notifies said second information processing apparatus, with encrypted communication, of said original real IP address of said first information processing apparatus, and wherein permission to issue said notification is given when said correspondence information has a correspondence information of said original real IP address of said second information processing apparatus and said original real IP address of said first information processing apparatus, and no permission is given to said notification when said correspondence information does not have a correspondence information of said original real IP address of said information processing apparatus and said original real IP address of said first information processing apparatus.

* * * * *